United States Patent [19]

Huang

[11] Patent Number: 5,111,778

[45] Date of Patent: May 12, 1992

[54] AUXILIARY EXHAUSTING DEVICE

[75] Inventor: Huei-Huay Huang, Hsinchu, Taiwan

[73] Assignee: Industrial Technology Research Institute, Taiwan

[21] Appl. No.: 657,908

[22] Filed: Feb. 20, 1991

[51] Int. Cl.$^5$ .............................................. F02B 75/02
[52] U.S. Cl. .............................. 123/65 PE; 123/65 V
[58] Field of Search .............. 123/65 PE, 65 V, 65 A, 123/65 P

[56] References Cited

U.S. PATENT DOCUMENTS

| | | | |
|---|---|---|---|
| 2,720,872 | 10/1955 | Yokoi | 123/65 V |
| 4,121,552 | 10/1978 | Mithuo et al. | 123/65 V |
| 5,000,131 | 3/1991 | Masuda | 123/65 PE |

FOREIGN PATENT DOCUMENTS

| | | | |
|---|---|---|---|
| 0025030 | 2/1984 | Japan | 123/65 PE |
| 0156925 | 8/1985 | Japan | 123/65 PE |

Primary Examiner—David A. Okonsky
Attorney, Agent, or Firm—Sughrue, Mion, Zinn, Macpeak & Seas

[57] ABSTRACT

An auxiliary exhausting device for improving the scavenging efficiency and the combustion efficiency of a two-stroke engine is provided. The auxiliary exhausting device includes an inner rotating member and an outer rotating member both having an opening communicable with an auxiliary exhausting port, two timing wheels respectively fixed to the inner and outer members with the one, which is fixed to the inner member, driven by the crankshaft, a positive driving device rotating the outer member, and a controller responsive to the operating condition of the engine for so controlling the positive driving device that the outer member is always desiredly rotated.

7 Claims, 10 Drawing Sheets

AUXILIARY EXHAUSTING DEVICE

BACKGROUND OF THE INVENTION

The present invention relates to an auxiliary exhausting device, and more particularly to one for a two-stroke engine.

Figure 2A:
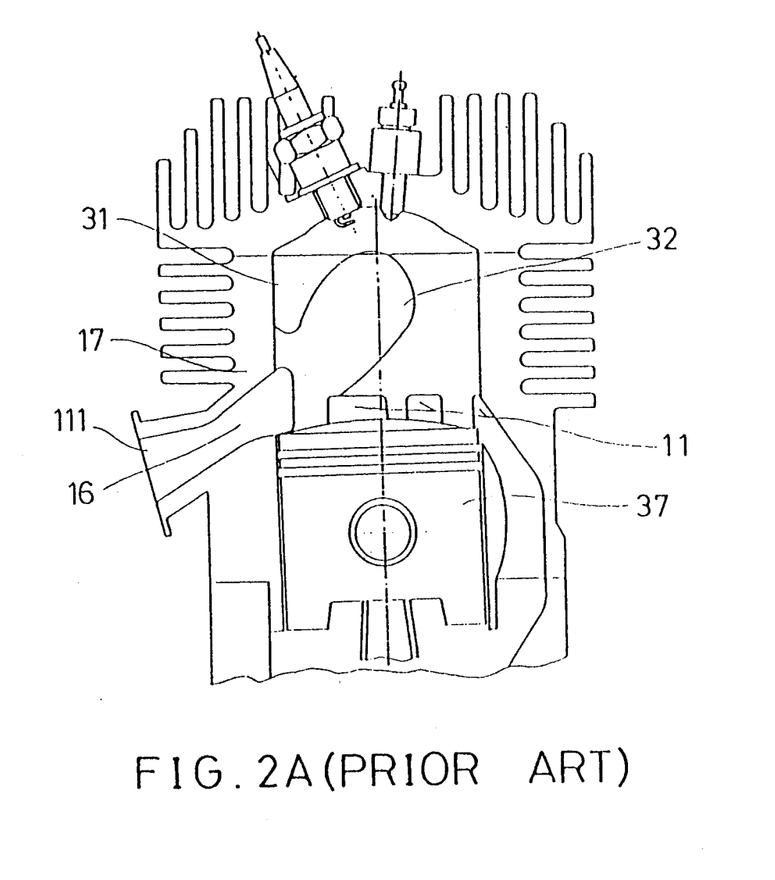
FIGS. 2A and 2B schematically show the intake air or mixture flow in a two-stroke engine under a high load.
Figure 2B:
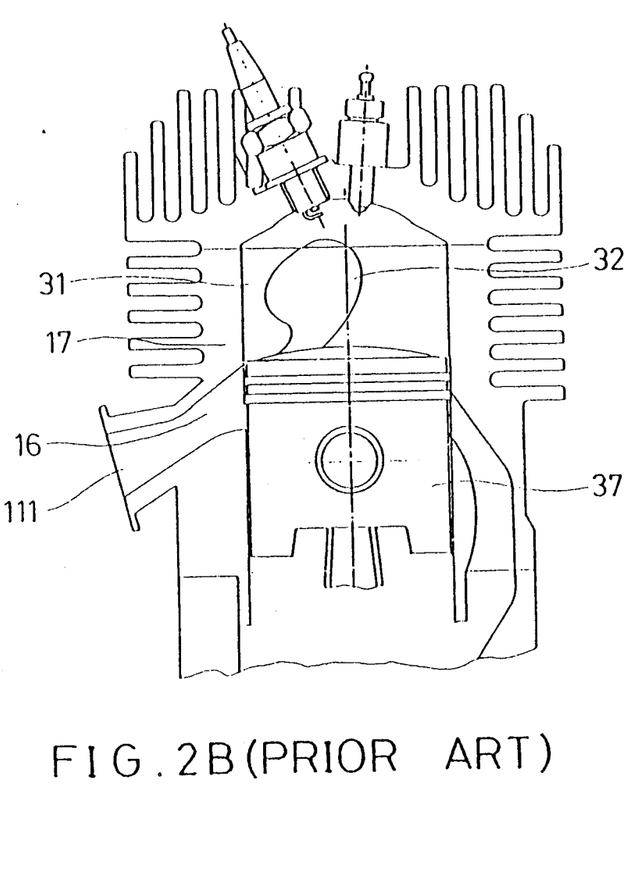

The scavenging process of a two-stroke carburreted gasoline engine is accomplished by using the unburn air fuel mixture to scavenge the residual burnt gas off the cylinder but suffers from the following disadvantages:

(1) The new mixture coming from the scavenging ports is partly discharged out of the exhaust port before the closing of the exhaust port; which is so-called as the "short-circuitting loss of unburn mixture." Under a low load, the intake new mixture is relatively less and can almost be kept in the cylinder so that the "short-circuitting loss" is relatively small. When the engine has an increasing load and the new mixture is in turn getting more and more, the "short-ciruitting loss" is accordingly increasing. As shown in FIGS. 2A and 2B showing a two-stroke engine subjected to a relatively high load, when the piston 37 reached the bottom dead center and begins to upwardly move (as shown in FIG. 2A), the scavenging mixture front 31 continues to flow toward the exhaust port 16 and the upwardly moving piston 37 will compress the cylinder gas which results in that before port 16 is closed by piston 37, some new mixture, which is the source of the short-circuitting loss and will be more if the engine load is larger, has been discharged out of port 16 as schematically shown in FIG. 2B.

Figures 1A, 1B, 1C:
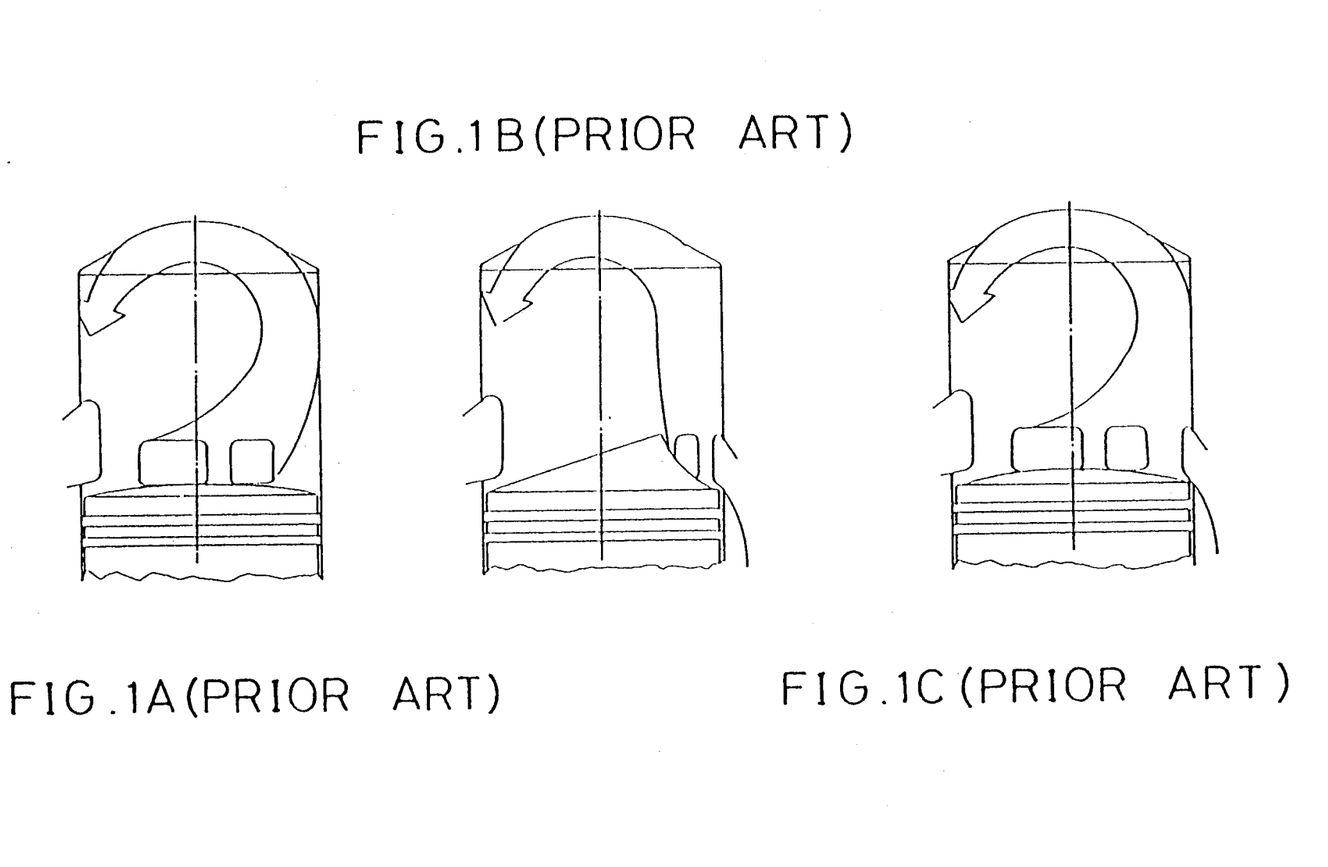
FIG. 1A is a sectional view showing a loop-scavenging engine and a new air or mixture flow therein.
FIG. 1B is a schematical view showing a new air or mixture flow in a cross-scavenging engine.
FIG. 1C is a schematical view showing a new air or mixture flow in a mixed type engine.
Figure 3A:
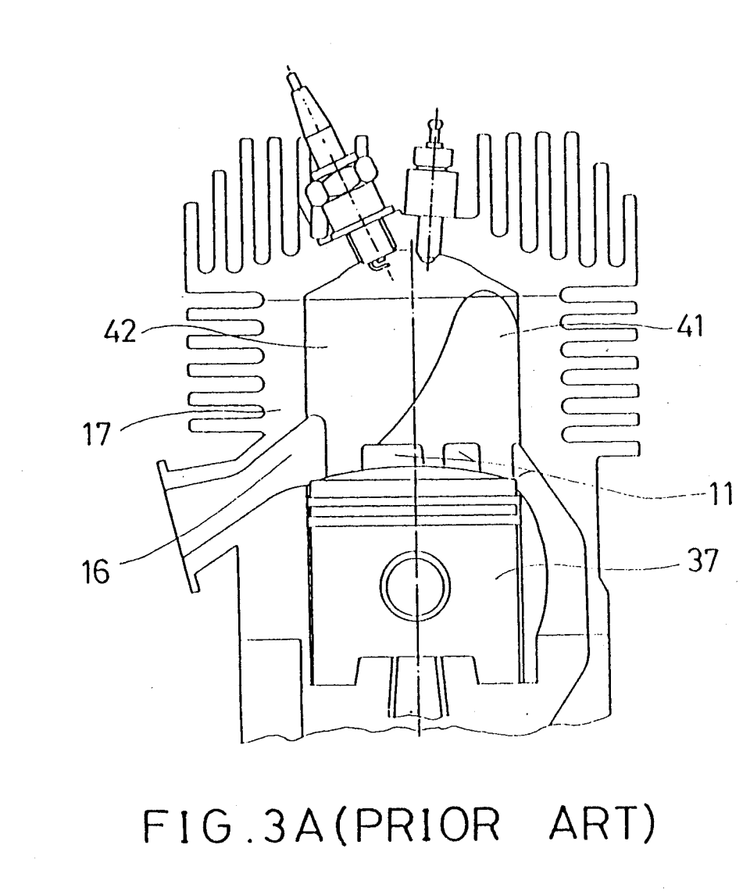
FIGS. 3A and 3B schematically show the intake air or mixture flow in a two-stroke engine under a relatively low load.
Figure 3B:
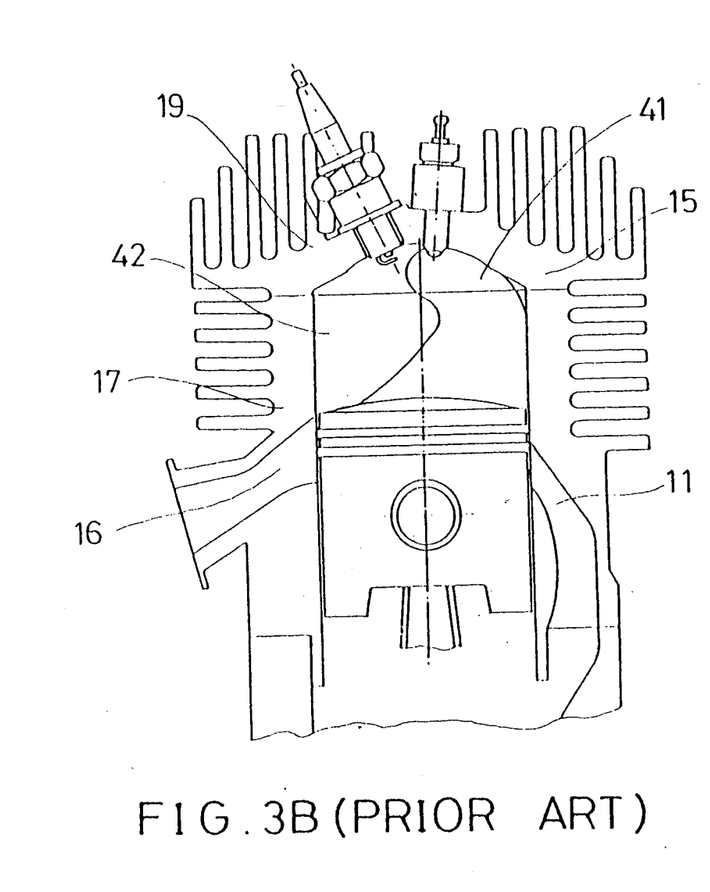

(2) The new mixture flow cannot effectively scavenge the residual gas off the cylinder which becomes worse when the engine has a low load or an idle speed since the intake new air is relatively less as schematically shown in FIGS. 3A and 3B. When piston 37 reached the bottom dead center and begins to upwardly move as shown in FIG. 3A, the scavenging mixture front 41 may not reach port 16 since the intake air flow from the scavenging port 11 is relatively weak. Even affer port 16 is closed by piston 37 as shown in FIG. 3B, scavenging mixture front 41 still may not reach the opposite cylinder wall surface 17 so that the cylinder inevitably contains therein the residual gas 42 resulted by the last combustion cycle which leads to that the probability of igniting the air mixture is reduced, the probability of the misfire of the mixture is increased and the propagation speed of the flame is reduced all of which are true for the loop-scavenging type, the cross-scavenging type or the mixed type as respectively shown in FIGS. 1A, 1B, and 1C. As an example, the residual burnt gas and the new mixture can have a volume ratio of 55:45 or even higher volume ratio under an idle operation of the engine.

SUMMARY OF THE INVENTION

It is therefore an object of the present invention to provide an auxiliary exhausting device enabling a two-stroke gasoline engine to have an improved scavenging efficiency.

It is further an object of the present invention to provide an anxiliary exhausting device enabling a two-stroke gasoline engine to have an improved combustion efficiency.

According to the present invention, an auxiliary exhausting device includes an inner rotating member and an outer rotating member both having an opening communicable with an auxiliary exhausting port of a cylinder, two timing wheels respectively fixed to the members with the one, fixed to the inner member, driven by the crankshaft, a positive driving device for rotating the outer member, and a controller responsive to the operating condition of the engine for so controlling the positive driving device that the outer member is always desiredly rotated.

The present invention may best be understood through the following description with reference to the accompanying drawings, in which:

DETAILED DESCRIPTION OF THE PREFERRED EMBODIMENT

Referring now to FIGS. 4A-9, first preferred embodiment of an auxiliary exhausting device for a two-stroke engine according to the present invention includes an auxiliary exhausting valve 18, a positive driving device 77 and a controller 78.

Figure 4A:
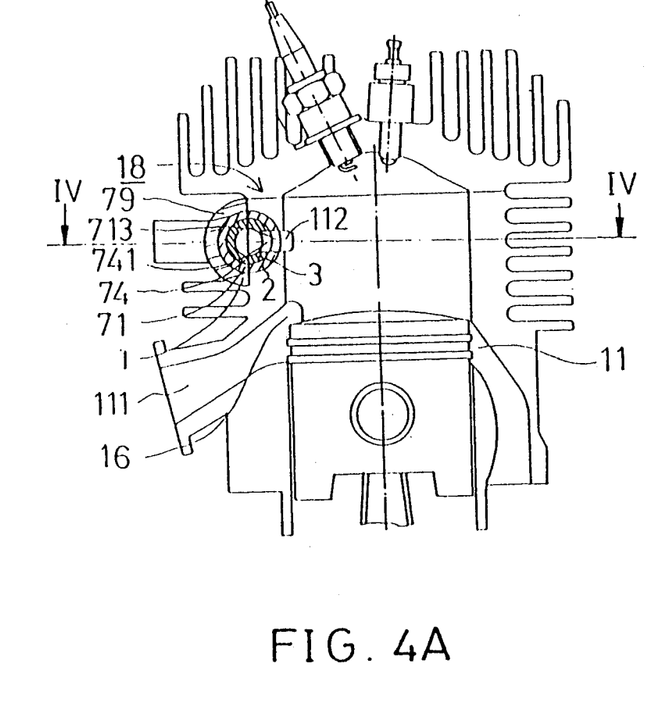
FIG. 4A is a sectional view showing a first preferred embodiment of an auxiliary exhausting device for a two-stroke engine according to the present invention.
Figure 4B:
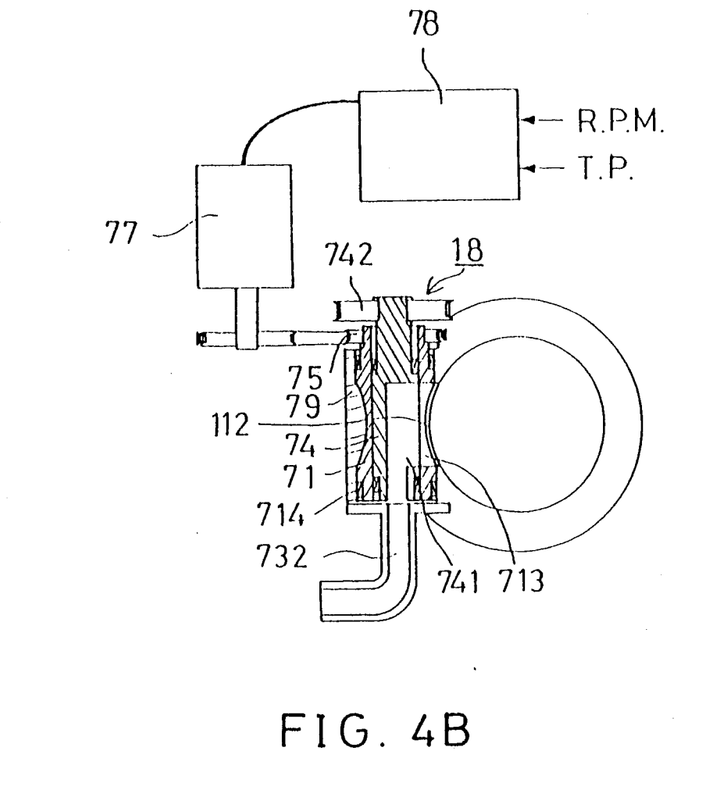
FIG. 4B is a sectional view taken along line IV—IV in FIG. 4A.

Valve 18 designed to cooperate with the engine exhaust pipe 111 for assistantly discharging the residual gas off the cylinder primarily includes a partly hollow inner rotating member 74 having an opening 741 communicable with the hollow center thereof, a hollow outer rotating member 71 coaxially and rotatably receiving therein inner member 74 and having an opening 713 communicable with the hollow center of member 74 and an auxiliary exhausting port 112 provided on the cylinder wall, a first timing (geared or belt) wheel 742 fixed to inner member 74 and driven by a engine crankshaft (not shown) in a manner that inner member 74 and the crankshaft have a rotating speed ratio of 1:1, a second timing (geared or belt) wheel 75 fixed to outer member and a semi-cylindrical cover 79 rotatably fixing outer member 71 to the engine cylinder.

Positive driving device 77 capable of being a stepping motor or the like engages with second timing wheel 75 for positively driving outer member 71. Controller 78 responsive to the operating conditions of the engine, e.g. the engine r.p.m. or T.P. (throttle position), controls positive driving device 77 in order that outer member 71 is always desiredly rotated by driving device 77.

Figure 9:
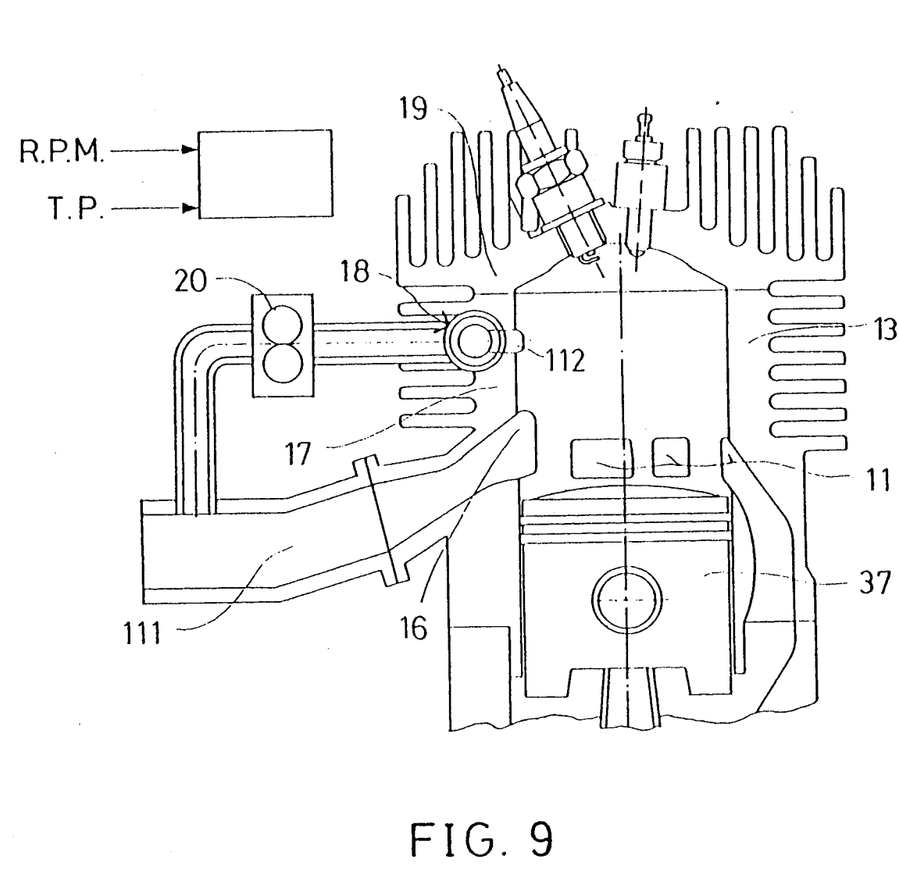
FIG. 9 is a sectional view showing that a two-stroke engine incorporating thereon an auxiliary exhausting valve in FIG. 4A incorporates thereto a suction pump.

As shown in FIG. 9, the present auxiliary exhausting valve 18 can be mounted on the cylinder side wall 17 above the exhausting port 16 or alternatively on the peripheral wall 19 of the cylinder head in order to reduce the quantity of the residual gas in the cylinder for improving the scavenging efficiency for the engine. Certainly, a suction pump 20 can be used for assistantly scavenging the residual gas off the cylinder. Alternatively, the auxiliary exhausting pipe can directly be coupled to exhaust pipe 111.

Figure 7A:
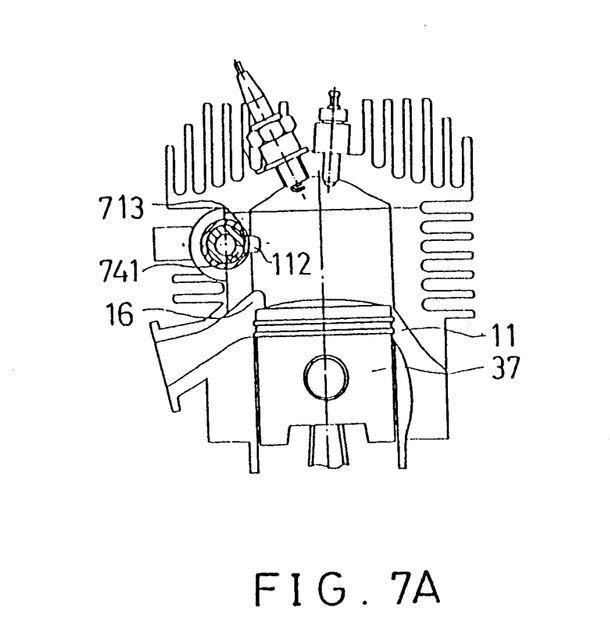
FIGS. 7A, 7B and 7C respectively show inner member in different rotated positions with an outer member of an auxiliary exhausting device in FIG. 4A kept fully aligned with an auxiliary exhausting port of the engine.
Figure 7B:
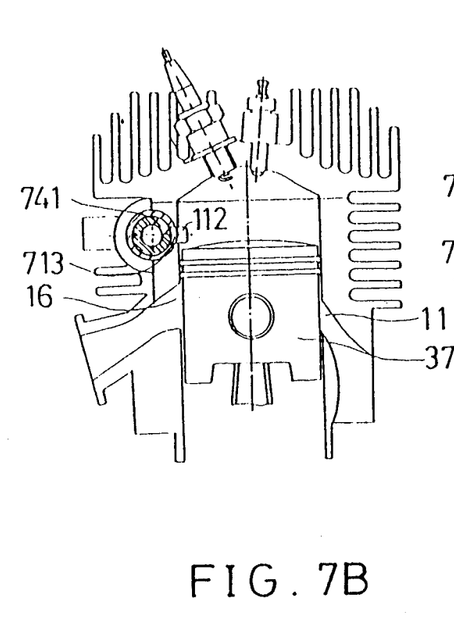

The operations of the present invention are as follows:

Since inner member 74 (in FIG. 4B) is directly driven, through timing wheel 742, by the engine crankshaft, the time the opening 741 of member 74 begins to align with opening 713 and port 112 as shown in FIG. 7A can be set at the time when piston 37 has just fully closed the scavenging port 11, and the time opening 741 goes beyond alignment with opening 713 or port 112 as shown in FIG. 7B can occur before piston 37 reach port 112. Certainly, by adjusting the relative position between timing wheel 742 and the crankshaft, the time opening 741 aligns or goes beyond alignment with opening 713 and port 112 can be changed, e.g. the time opening 741 aligns with opening 713 can be delayed until piston 37 has closed exhaust port 16 and the time opening 741 goes beyond alignment with opening 713 and port 112 is accordingly delayed, e.g. until piston 37 has closed port 112.

Figure 7C:
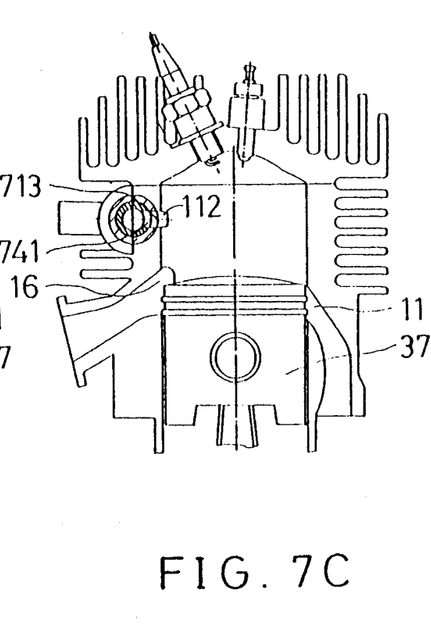
Figure 8A:
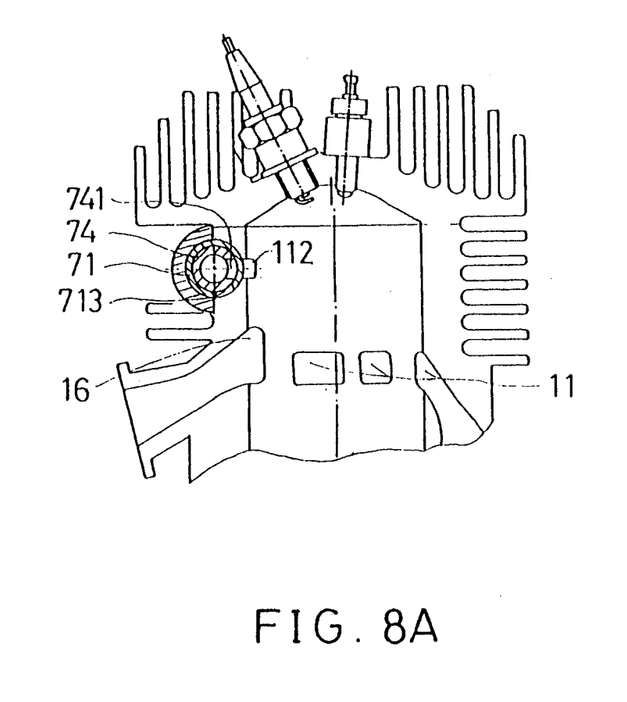
FIGS. 8A and 8B respectively show an outer member in two different positions with an inner member of an auxiliary exhausting device in FIG. 4A kept fully aligned with an auxiliary exhausting port of the engine.

As shown in FIG. 7C, if outer member 71 is rotated by driving device 77 controlled by controller 78 responsive to the engine r.p.m. and T.P. (throttle position) to the state that opening 713 fully aligns with opening 741 and port 112, the exhaust gas in the engine cylinder can discharge out of auxiliary port 112. If opening 713, as shown in FIG. 8A, goes beyond alignment with opening 741 and port 112, the exhaust gas cannot be discharged. It can thus be known that whether the auxiliary exhausting valve can discharge the exhaust gas is determined by whether openings 741, 713 and port 112 are aligned which is in turn determined by the engine r.p.m. and T.P..

Figure 5:
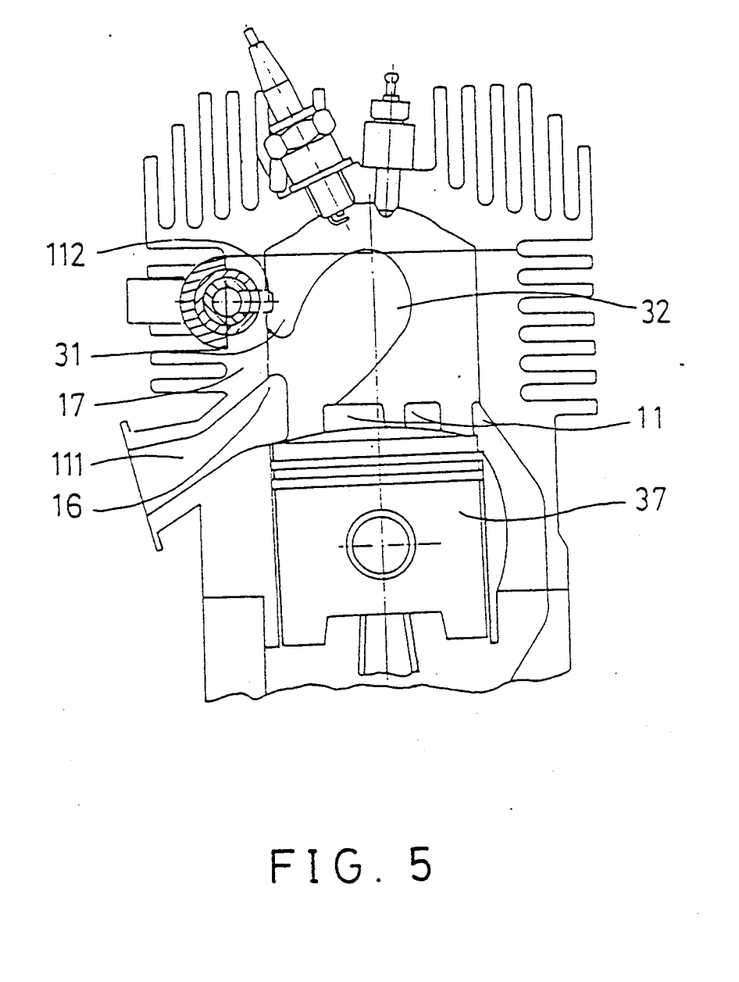
FIG. 5 shows that under a relativeliy high load, a two-stroke engine incorporating thereon an auxiliary exhausting device in FIG. 4A is scavenging.
Figure 6:
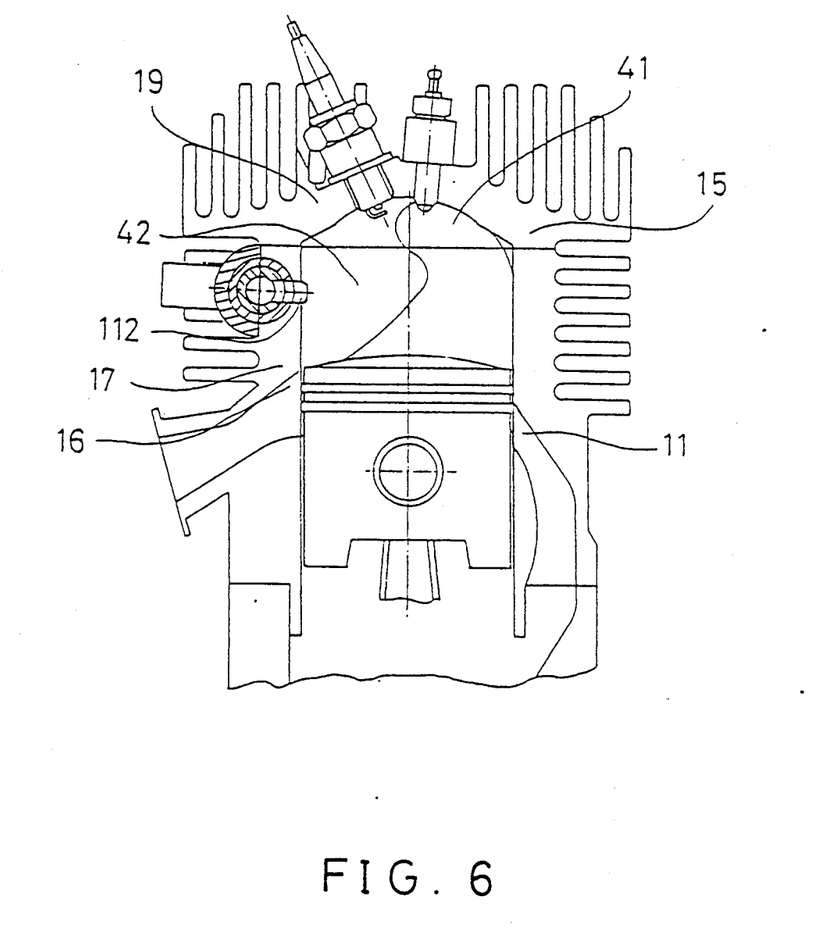
FIG. 6 shows that under a low load, a two-stroke engine in FIG. 5 is scavenging.
Figure 8B:
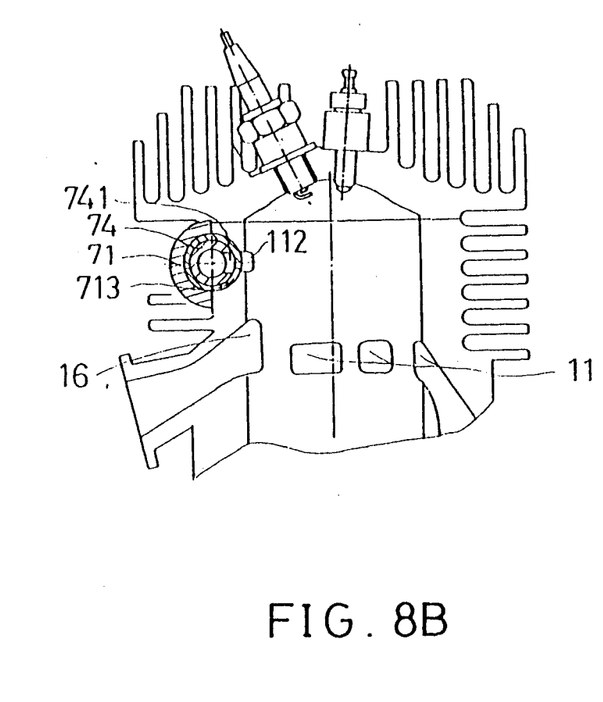

Under a relatively high load, although the new air front 31 will pass through port 112 as shown in FIG. 5 and inner member 74 driven by the crankshaft has its opening 741 periodically aligned with port 112, controller 78 controlling device 77 driving timing wheel 75 fixed to outer member 71 can fully or gradually set opening 713 to be beyond alignment with opening 741 and port 112 as shown in FIGS. 8A or 8B so that no new air can escape from the present valve 18. If the engine has a low load or an idle rpm to have a relatively weak new air flow as shown in FIG. 6, the new air front 41 in the engine cylinder cannot reach port 112 before the piston closes port 16 so that controller 78 can allow opening 713 to fully align with opening 741 and port 112 for scavenging the exhaust gas in the engine cylinder to the largest extent also as shown in FIG. 7C.

Generally speaking, auxiliary valve 18 can be opened at the time when exhaust port 16 is closed. In practical application, the time valve 18 is opened can be made earlier at the time after scavenging ports 11 are entirely closed which means that ports 112 and 16 can simultaneously discharge the exhaust gas between the time scavenging ports 11 are closed and the time port 16 is closed. The time auxiliary valve 18 should be closed is determined by when the intake new air will reach the area adjacent port 112 which is in turn determined by the engine load and the engine r.p.m. That is, if there is a relatively strong new air flow, valve 18 should be closed early in order to avoid the "short-circuitting loss" and under a relatively low engine load, valve 18 can be closed after piston 37 has closed port 112 to ensure that a best scavenging efficiency is obtained.

Port 112 with which scavenging ports 11 are preferably symmetrically provided on the cylinder wall should be provided on side wall 17 above port 16 but can be optimally positioned only when one considers whether it resides at the projective center of the exhaust gas region in the cylinder in order to obtain a preferable scavenging efficiency.

Figure 10A:
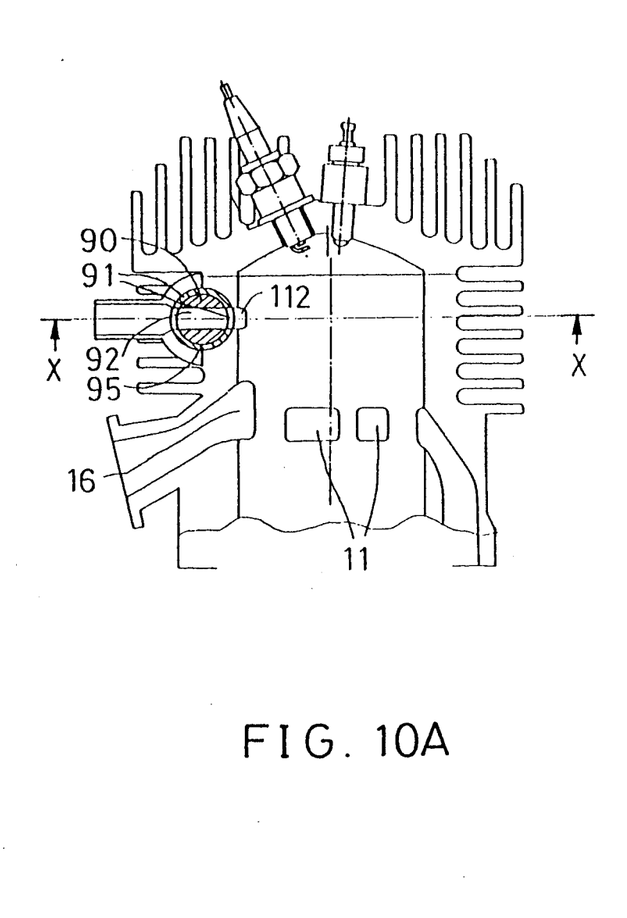
FIG. 10A is a sectional view showing a second preferred embodiment of an auxiliary exhausting device for a two-stroke engine according to the present invention.
Figure 10B:
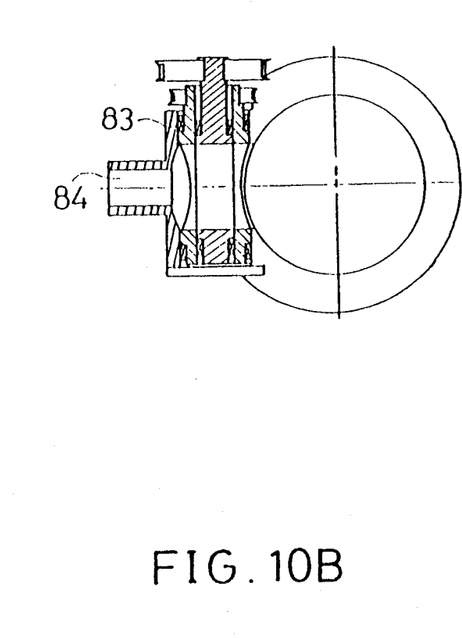
FIG. 10B is a sectional view taken along line X—X in FIG. 10A.

FIGS. 10A and 10B show a second preferred embodiment of an auxiliary exhausting device according to the present invention which compared with the first preferred embodiment, has a solid inner rotating member 90 having a radial through hole 92, and an outer rotating member 95 having two diametrically opposite holes 91 communicable with hole 92. In a rotation cycle, through hole 92 can twice align with port 112 so that inner member 90 and the crankshaft should have a rotating speed ratio of 1:2 which makes it possible that inner member 90 has a reduced r.p.m., however, inner member 90 must have an increased intermediate diameter in order to maintain a constant time period during which hole 92 gets in full or partial alignment wiht holes 91. Certainly, the auxiliary exhausting pipe 84 can be connected to the cover 83.

Controller 78 of the present invention can be an electronic controller "mapping" into the memory thereof the engine characteristics so that when the operating conditions of the engine are fed thereinto, controller 78 can desiredly open or close the auxiliary valve 18.

In sum, the present auxiliary exhausting device has the following advantages:

(1) Under an engine low load operation, the present auxiliary exhausting device can improve the scavenging efficiency or increase the purity p (=the fresh air volume/(the fresh air volume+the exhaust gas volume) of the air in the cylinder so that the probability of the misfire of mixture is reduced and a rapid combustion rate is obtained in order that under a low load, a two-stroke gasoline engine still can have a combustion efficiency approximately equivalent to that of a 4-stroke gasoline engine.

(2) The present invention can also be introduced into the fuel injection application in order to avoid the short-circuitting loss of the unburn fuel-air mixture under a relatively high engine load.

(3) In order to incorporate therein the present auxiliary device, a two-stroke engine needs not have the basic structure thereof been changed.

(4) The complicated valve mechanism is conventionally thought to be provided on the cylinder head thus inevitably having an increased height and volume as a 4-stroke engine cylinder head normally has. Since the present auxiliary exhausting device can be provided on the cylinder side wall, a cylinder incorporating thereon the present device still can have a structurally simple head having a normal low height which is important for a car to have a low air-resistance.

(5) The operation of the conventional valve mechanism for the engine cylinder is independent from the operating conditions of the engine so that the cylinder cannot always have the best scavenging efficiency which is no more true for a cylinder incorporating thereon the present auxiliary valve. Furthermore, since the inner and outer rotating members are rotating and mounted on the cylinder side wall, they need not use the expensive material for the intake or exhaust valve since they does not subject to a relatively large impact force.

The above described embodiments are not limitative but only illustrative for the present invention and can be changed and modified by those skilled in the art without departing from the spirit and scope of the present invention which is defined in the appended claims.

What I claim is:

1. An auxiliary exhausting device for a two-stroke engine including a crankshaft and a cylinder provided, in a wall thereof, with scavenging ports, said auxiliary exhausting device including at least one auxiliary exhausting port provided in the cylinder wall and located closer to the top of the cylinder than the scavenging ports, an inner rotating member having a first opening communicable with said auxiliary exhausting port;
   a first timing wheel fixed to said inner member and driven by said crankshaft;
   a hollow outer rotating member coaxially and rotatably receiving therein said inner member and having a second opening communicable with said auxiliary exhausting port;
   a second timing wheel fixed to said outer member;
   a positive driving device engaging said second timing wheel for rotatably driving said outer member; and
   a controller responsive to an operating condition of said engine for controlling operation of said positive driving device such that the timing of rotation of said outer member is always as desired.

2. An auxiliary exhausting device according to claim 1, further comprising an auxiliary exhaust pipe connecting said auxiliary exhausting port to a primary exhaust pipe for said engine via said inner and outer rotating members.

3. An auxiliary exhausting device according to claim 2 wherein said auxiliary exhaust pipe mounts thereto a suction pump for sucking thereto an exhaust gas from said cylinder.

4. An auxiliary exhausting device according to claim 1 wherein said inner member has a hollow center communicable with said first opening, and said first opening is communicable with said second opening so that, when said auxiliary port, said openings and said hollow center communicate with one another, said auxiliary exhausting device can exhaust therefrom an exhaust gas from said cylinder.

5. An auxiliary exhausting device according to claim 4 wherein said inner member and said crankshaft have a rotating speed ratio of 1:1.

6. An auxiliary exhausting device according to claim 1 wherein said first opening is radial through one side of said inner rotating member and said second opening is formed by two diametrically opposite holes in said outer rotating member.

7. An auxiliary exhausting device according to claim 6 wherein said inner member and said crankshaft have a rotating speed ratio of 1:2.

* * * * *